Patented Apr. 11, 1939

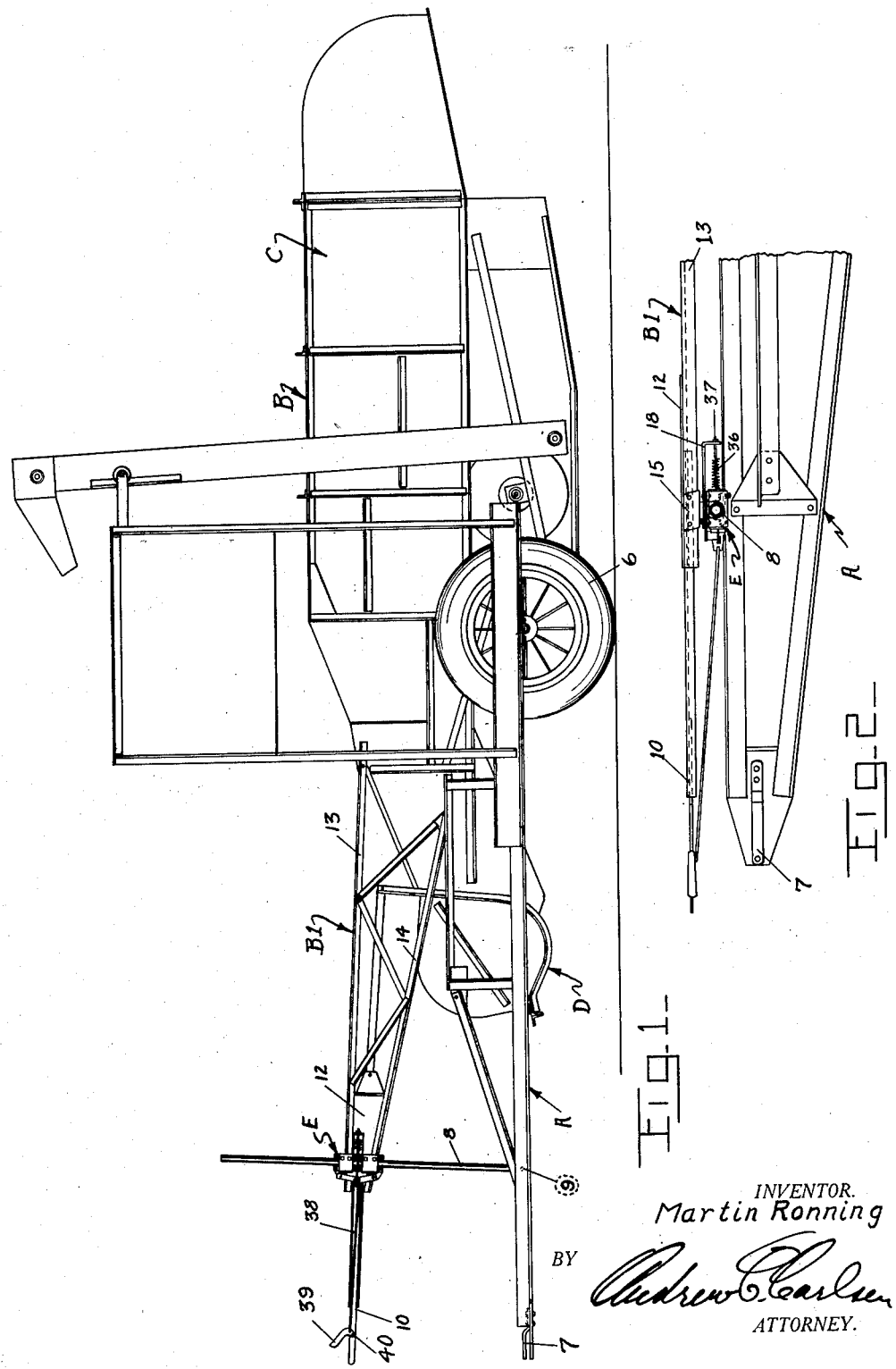

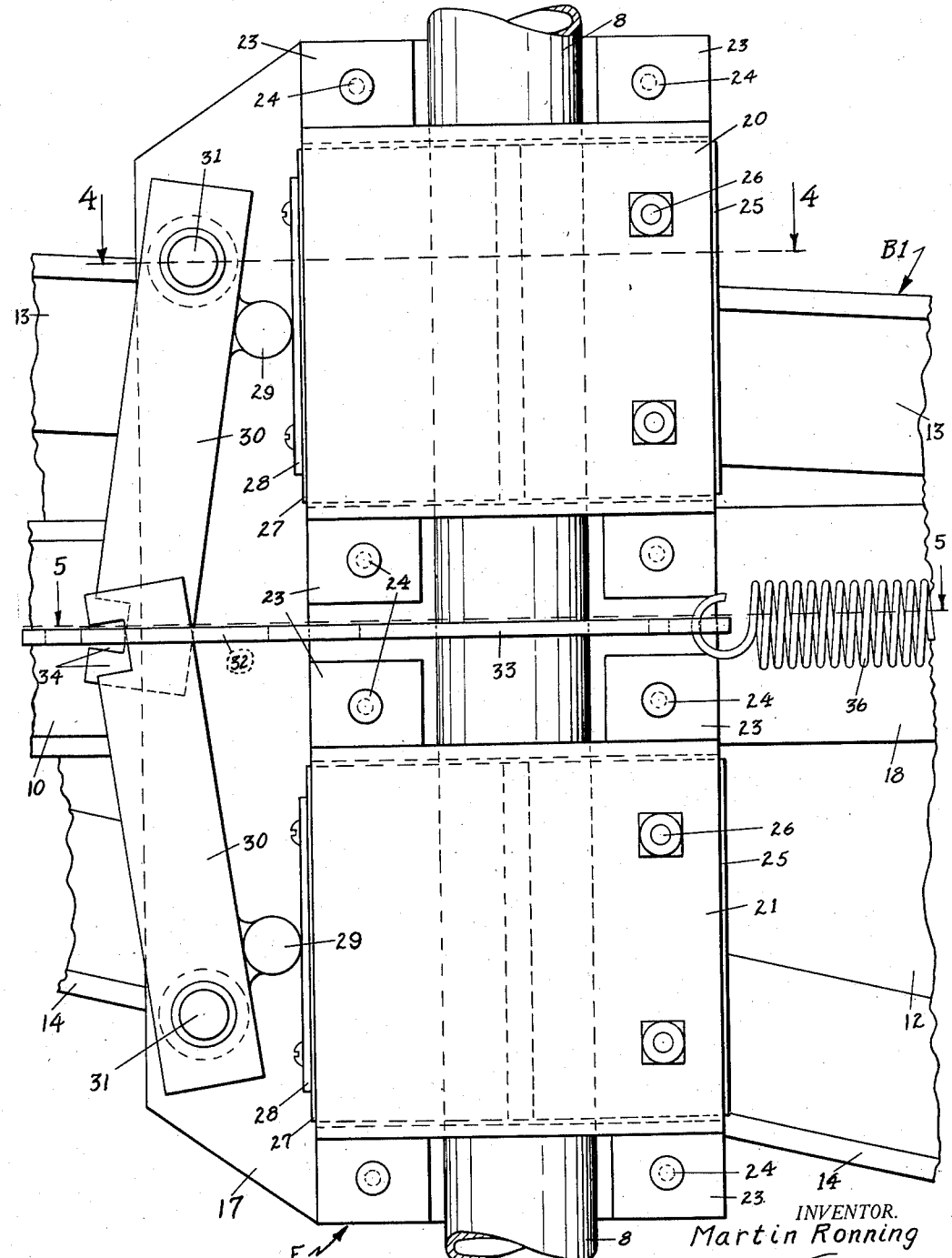

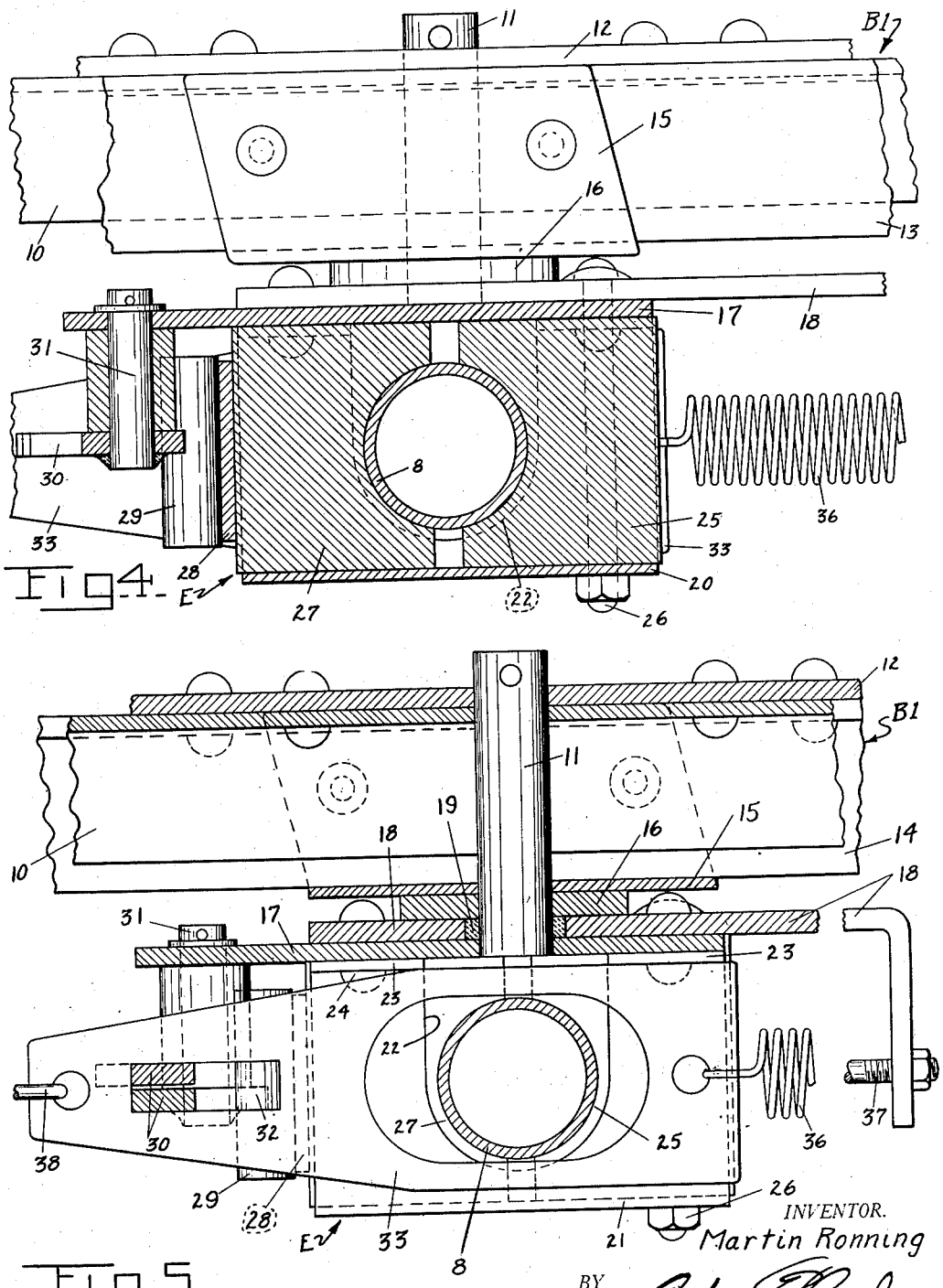

2,153,593

UNITED STATES PATENT OFFICE 2,153,593

IMPLEMENT FRAME ADJUSTING DEVICE

Martin Ronning, St. Louis Park, Minn., assignor to Minneapolis-Moline Power Implement Company, Minneapolis, Minn., a corporation of Delaware Application January 29, 1937, Serial No. 122,988

8 Claims. (Cl. 56—218)

This invention relates to devices for adjusting and releasably securing frames of implements such as are commonly drawn by tractors or horses, and the drivers of which frequently desire to have means within their reach for effecting such frame adjustments. More particularly the object is to provide a frame adjuster which comprises an upright bar, attached to a relatively stationary portion of the machine, a friction grip device secured to the adjustable frame portion of the device and for adjustable gripping engagement with the bar, and an operating lever projecting forwardly from the grip device to operate the same and to effect the necessary frame adjustment when the grip device is manually released with respect to the bar. Other and more specific objects will be disclosed in the course of the following specification, reference being had to the accompanying drawings, in which:

Fig. 1 is a side elevation of a combine harvester implement showing my improved frame adjuster as applied thereto.

Fig. 2 is an enlarged top or plan view of the frame and adjuster mechanism at the forward or left end of the machine, as seen in Fig. 1.

Fig. 3 is an enlarged detail elevation of the frame adjuster unit as shown in Figs. 1 and 2.

Figs. 4 and 5 are sectional detail views taken on lines 4—4 and 5—5, respectively, in Fig. 3.

Referring to the drawings more particularly and by reference characters, A designates the draft frame of a combine, the rear end of the frame being carried by ground wheels 6, while the forward end 7 is designed for hitching attachment to a tractor draw bar or to a separate truck as when the machine is horse drawn. The combine or implement proper may be considered as embodying an implement frame B which supports the separator or threshing apparatus C and a crop severing or harvesting unit D. The entire assembly B—C—D is tiltable on the ground wheel axis, and with respect to the draft frame A, in order that the working or cutting elevation of the harvester may be properly adjusted.

To tiltably adjust and secure the implement in proper adjusted position the frame B is provided with an extension $B^1$, which projects forwardly at an elevation above frame A, and toward the tractor or other vehicle to which the frame A is attached; and the extension $B^1$ is adjustably connected to the frame A by an upright bar or pipe 8 which is pivoted at 9 to frame A while its upper portion is slidably adjustable with respect to the upper frame in a manner presently to be described. The frame extension $B^1$ includes a lever arm 10 which projects sufficiently far forward so as to come within reach of the tractor operator, and this lever arm is rigid with the frame so that when the latter is released with respect to bar 8 the operator may lift or lower the arm to correspondingly adjust the working elevation of the harvester cutters with respect to the ground surface.

The device for releasably securing the frame extension $B^1$ with respect to the bar 8 comprises a gripping unit E having a rigid, laterally projecting pin 11 (Figs. 4 and 5) which has oscillating bearing engagement in frame extension $B^1$ to thereby tiltably support the unit E. The pin has bearing engagement in the lever arm 10, and in a plate 12 to which the lever arm is secured, said plate also serving to connect upper and lower angle iron rails 13 and 14, respectively, of the frame $B^1$. The pin also bears in a generally U-shaped bearing plate 15, upper and lower flanges of which attach to the horizontal flanges of the rails 13 and 14. A washer 16 on the pin 11 and between the plate 15 and unit E gives the latter sufficient freedom for oscillating action.

The grip unit proper comprises a plate member 17 which, together with an arm 18, is rigidly secured to the pin 11 as by welding 19 (Fig. 5). Upon upper and lower portions of the plate 17 are secured a pair of bracket housings 20 and 21 having upper and lower end openings 22 through which the bar 8 freely passes. The members 20 and 21 have vertically projecting integral lugs 23 which are riveted as at 24 to the plate 17.

Within the bracket members 20 and 21 are secured pairs of friction blocks, each pair comprising a fixed block 25, rigidly secured as by bolts 26, and a movable block 27 which is adjustable with respect to the block 25. The inner faces of all the blocks are vertically channeled or recessed (Fig. 4 so as to slidably and frictionally engage the surface of the bar 8.

The forward or exposed faces of the blocks 27 are provided with wear plates 28 against which operate bearing lugs 29 secured on a pair of lever acting arms or links 30. The members 30 are pivotally secured at upper and lower ends by pins 31 to a forwardly extending flange of the plate 17, while intermediate, overlapping ends of the levers extend through a slot 32 in a yoke 33 which is disposed horizontally between the bracket housings 20 and 21. Said intermediate or overlapped ends of levers 30 are preferably notched as at 34 (Fig. 3) to insure proper operative engagement with the yoke 33.

The yoke member 33 is mounted for reciprocating movement and is provided with an elliptical or elongated opening 35 (Fig. 5) through which the bar 8 passes and which permits of the necessary bar and yoke movements without binding. The rear end of the yoke plate 33 is connected by a tension spring 36 to an angular extension of the arm 18, an attaching bolt 37 being employed and providing means for regulating the spring tension.

The forward end of the yoke plate 33 is connected by a pull rod 38 to a finger lever 39 which is pivoted as at 40 to the forward end of the hand lever 10.

The operation of the device may be briefly described as follows: The spring 36 being under tension exerts a constant rearward pull on the yoke plate 33, and this pull is in turn transmitted through the lever arms 30 and bearing lugs 29 to the bearing plates 28. The resulting pressure on the blocks 27 forcibly pushes them rearwardly toward the fixed friction blocks 25, with a result that the very firm gripping action is created about the bar 8. In fact the gripping action thus produced is sufficient to secure the frame extension B¹ in fixed position on the bar 8, which circumstance in turn supports the harvester unit D in its proper operative or cutting position with respect to the surface of the ground.

It is to be noted, however, that should the harvester unit meet with a boulder, stump, or other obstruction which would have a tendency to force the cutting mechanism upwardly, then such upward movement may take place inasmuch as the gripping unit E may, under pressure, be moved upwardly on the bar 8 without first releasing the spring 36.

When a manual adjustment of the harvester is to be made then the operator merely grasps the hand lever 10 and actuates the finger lever 39 to pull the yoke 33 forwardly against the pulling tension of the spring 36. This action will release the gripping blocks 27 from the squeezing pressure normally exerted by the spring 36, and when the blocks are thus released the operator may freely move the hand lever 10 up and down until the desired harvester adjustment is secured, at which time the operator releases the finger lever 39, and the spring 36 again goes into action to releasably secure the gripping unit E on the bar 8.

The pivot support 9 for the bar 8, with respect to frame A, and the pivot support 11 for the unit E, with respect to the frame B¹, provide for the necessary freedom of action during adjustment movements as the frame extension B¹ moves on an arc, and from a point rearward of pivot center 9. It is understood that the bearing lugs 29, being disposed adjacent to the fulcrum centers 31 of the levers 30, will greatly increase the power of the spring 36 as applied to the overlapping and notched end portions of the levers.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. A device for adjustably connecting a tiltable implement frame with respect to a draft member comprising, a holder tiltably carried by the frame and having two pairs of gripping blocks, a bar extending from the draft member and between the blocks of each pair, a pair of levers, one lever for each pair of blocks, to exert pressure thereon, and a spring actuated device connected to both of said levers for holding them under block gripping tension.

2. A device for adjustably supporting a tiltable implement frame relative to a draft device and a bar extended therefrom, the same comprising a gripping unit adapted to be connected to the implement frame and having blocks frictionally engaging the said bar to support the frame against tilting movement thereon, a lever device operatively associated with the blocks for manually releasing their grip upon the bar, and spring pressed means for yieldably engaging the blocks with the bars whereby the implement frame may be forcibly tilted without releasing the grip of the blocks.

3. A device for adjustably connecting a tiltable implement frame with respect to a draft member, the same comprising a holder for tiltable mounting on the frame, gripping blocks mounted in the holder, a bar for support from the draft member and adapted to be engaged by the said blocks, a lever pivoted adjacent the blocks and spring set to normally urge the blocks into frictional engagement with the bar in a direction at right angles to the axis thereof, a yoke engaged with the said lever, and manually operated means for actuating the said yoke and lever to release the blocks from engagement with the bar.

4. A device for adjustably supporting a tiltable implement frame with respect to a draft member, the same comprising a holder for pivotal mounting on the frame, blocks adjustably mounted in the holder, a bar for extension from the draft member through the holder, a lever pivoted adjacent the blocks and having pressure engagement therewith, and a yoke connected to the lever and spring set to normally exert a pressure through the lever to the blocks whereby the blocks will have a yieldable frictional engagement with the bar to normally sustain the implement frame against tilting motion, but to permit forcible movement of the frame relative to the draft member.

5. A device for supporting a frame member on a supporting bar, the same comprising a gripping unit for mounting on the frame member in frictional engagement with the supporting bar to thereby support the frame member, and the said gripping unit also having yieldable engagement with the bar for enabling sliding movement of the gripping unit on the bar in response to shocks and stresses placed on the frame member.

6. A device for supporting a movable frame member on a supporting bar, the same comprising a gripping unit for mounting on the frame member and having gripping elements frictionally engaging the bar to thereby normally retain the frame member in adjusted position on the bar, and the said gripping elements being yieldably supported for slidable movement on the bar responsive to force applied to the frame member.

7. A device for yieldably supporting a frame member upon a supporting bar, the same comprising a gripping unit for mounting upon the frame member and having retractable gripping members for frictional engagement with the bar, and the said gripping members being yieldably supported for limited sliding movement along the bar while in frictional engagement therewith.

8. A device for adjustably supporting a frame member upon a supporting member, the same comprising a gripping unit for mounting upon the frame member and having manually retractable gripping elements frictionally engaging the supporting member, and yieldably supported for forcible movement on the supporting member independently of their manual retraction therefrom.

MARTIN RONNING.